Aug. 7, 1956     F. W. YOUNG     2,757,690

METAL HOSE VIBRATION DAMPER

Filed May 6, 1952

INVENTOR
FRANCIS W. YOUNG

BY Charles Warren
ATTORNEY

2,757,690
METAL HOSE VIBRATION DAMPER

Francis W. Young, East Hartford, Conn., assignor to United Aircraft Corporation, East Hartford, Conn., a corporation of Delaware Application May 6, 1952, Serial No. 286,262

11 Claims. (Cl. 138—58)

The present invention relates to vibration damped flexible metal hose and the method of manufacture thereof.

Flexible metal hose is today finding use in aircraft turbo-jet and turbo-prop engines and their afterburners where the hose unit is subjected to high temperature and must be capable of withstanding engine vibrations and still have a sufficient degree of flexibility to conform to the movement of connected engine components. Aircraft hoses must be light in weight and flexible at temperatures lower than minus 100° F. (below zero) as well as at temperatures approaching 800° F.

This hose generally consists of an inner metal tube corrugated circumferentially so as to be flexible or some type of thin walled metal conductor convoluted for flexibility. This tube or conductor is enclosed in a braided wire sheath which protects and is the same length as the tube and both ends of the tube and sheath are integrally attached as by brazing, welding or soldering or otherwise mechanically attached to connecting fittings. A further purpose of the braided wire sheath is to serve to restrain the expansion of the flexible tube radially and longitudinally when it is subjected to internal pressures.

This metal hose will carry fluids which would chemically attack rubber and can withstand higher and lower temperatures.

One object of the present invention is to provide a vibration damped flexible hose of greater hose life by preventing metal fatigue failures due to vibrations.

A further object of the present invention is to provide a vibration damped flexible metal hose whose degree of flexibility is not affected by large temperature changes in operation.

A further object of the present invention is to provide a method of manufacturing a vibration damped flexible metal hose so that the hose unit can be inspected and pressure tested before the vibration damping means are applied.

A most important object of the present invention is to provide a flexible metal hose which is vibration damped throughout its entire length.

An advantage of my hose is that vibration damping occurs for the full length of the flexible tube and the sheath especially at the fittings. It is of great advantage to have vibration damping throughout the full length of the flexible tube and sheath for the majority of hose failures occur at or near the end connecting fittings. This location is most susceptible to fatigue failures because the portion of the metal which connects the flexing hose to the non-flexing fitting is subjected to severe stresses. For this reason it is important that the portion of the flexible hose adjacent to end connecting fittings be vibration damped.

A further advantage of my hose is that the flexible tube, the braided wire sheath and the end connecting fittings can be assembled, inspected and pressure tested prior to applying and curing the vibration damping compound. The advantages of being able to inspect and pressure test the hose unit are the saving of time and expense of having to remove the cured vibration damping compound from the hose unit if leakage occurs, and reapplying and curing the vibration damping compound after repair.

Other features and advantages of the invention will more fully appear from the following detailed description taken in connection with the accompanying drawings in which.

Figure 1:
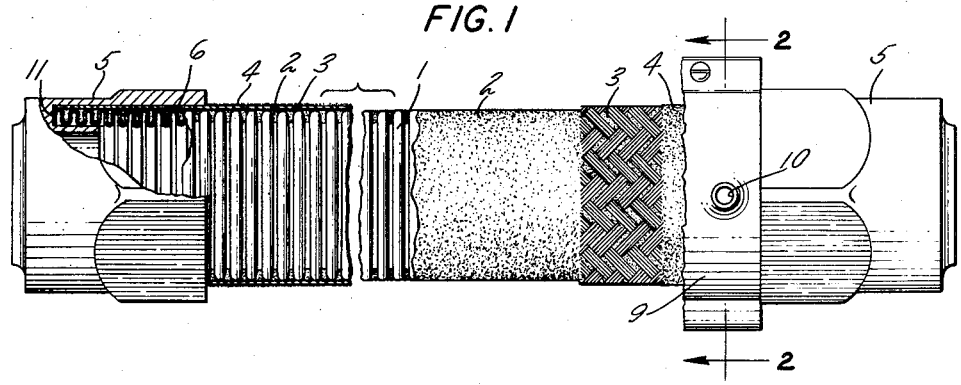
Fig. 1 is a view partly in section and partly in elevation of a flexible metal hose embodying my invention.

Referring first to Fig. 1, the hose consists of a length of circumferentially corrugated metal tubing 1, a braided wire sheath 3 of equal length and connecting fittings 5. The fittings may have annular recesses 6 in the end face to receive the ends of the tube and sheath, and in which the tube and sheath are permanently attached, as by brazing, welding, soldering or otherwise mechanically attached.

Vibration damping is effected by means of a vibration damping compound 2 which extends into the convolutions of the tube and preferably extends outwardly through the braided wire sheath 3. Sheath 3 may be protected from abrasion by a surrounding layer of vibration damping compound 4 which in some instances is a continuation of the vibration damping compound 2 and in all instances adheres to vibration damping compound 2. It will be noted that the vibration damping compound forms a one-piece damper 2 extending the full length of flexible tube 1 and abuts the end connecting fittings 5 so as to provide vibration damping throughout the full length of the tube 1. The purpose of vibration damping is to prevent the parts to which the flexible hose unit is attached in operation from transmitting their vibrations to the hose to such an extent as to cause fatigue failure of the convoluted metal hose due to excessive flexing of the hose unit. As described previously, the most damaging flexing in the hose unit occurs adjacent the rigidly attached connection fitting 5 or any other portion of the hose adjacent to the area clamped or supported for mounting or hose routing.

As used in this description, the term vibration damping compound is to mean a rubber-like or resilient or elastic compound of known type such as silicone.

To manufacture the hose shown in Fig. 1, a flexible metal hose of suitable length 1 has the protective braided wire sheath 3 placed around it and both ends of the tube 1 and sheath 3 are integrally attached to the end connecting fitting 5 as by brazing, welding, soldering or a mechanical connection. At this point in manufacture it is possible and advantageous to inspect and pressure test the hose assembly to insure that tube 1, fitting 5 and the attachment means therebetween are pressure tight to the degree required. The hose assembly may also be attached to the apparatus on which it will be used to insure that the length is proper.

A layer of uncured vibration damping compound is applied as a coating surrounding sheath 3 for the full length of the sheath. By means of compression, such as by an enclosing mold or by wrapping tape, as hereinafter described, the uncured vibration damping compound is caused to penetrate inwardly through the braided wire sheath 3 and into the exteriorly or inwardly extending opening corrugations of the tube. By proper application of pressure and proper selection of the amount of uncured vibration damping compound to be coated on sheath 3, the uncured vibration damping compound can be caused to penetrate into these exteriorly opening corrugations for the full length of tube 1 and within the recesses 6 abut against the end surfaces 11 of the end connecting fitting 5, more or less completely filling the convolutions as desired.

To cause the uncured vibration damping compound to press inwardly through the braided wire sheath 3 and into the convolutions of tube 1, several processes may be employed.

In the first of these processes, a cylindrical mold 9 with proper diametrical clearances, is placed around the braided wire sheath 3. Mold 9 is of such a length that it abuts end fittings 5 and it has a series of diametrically opposed holes or slots, 10 and 12, throughout its length. If holes are used as the apertures through which the uncured compound is to be supplied to the hose assembly, the holes would be arranged longitudinally along the mold and would be fed by a common manifold, so shaped that the uncured compound is fed to each of the holes in this longitudinal series. If the aperture through which the uncured compound is supplied to the hose assembly is a slot, the slot would be fed by such a manifold, also, to insure even distribution. Uncured vibration damping compound is forced, under pressure, through holes or slots 10 on one side of mold 9 and thence through braided wire sheath 3 and into the corrugations of tube 1 then out openings 12. Uncured silicone or other vibration damping compound then fills all available space within the mold so that tube 1 and sheath 3 will be vibration damped throughout their entire lengths. Mold 9 can also be used as the constricting member during oven curing of the vibration damping compound. The mold will of necessity be split for assembly over the hose.

Figure 4:
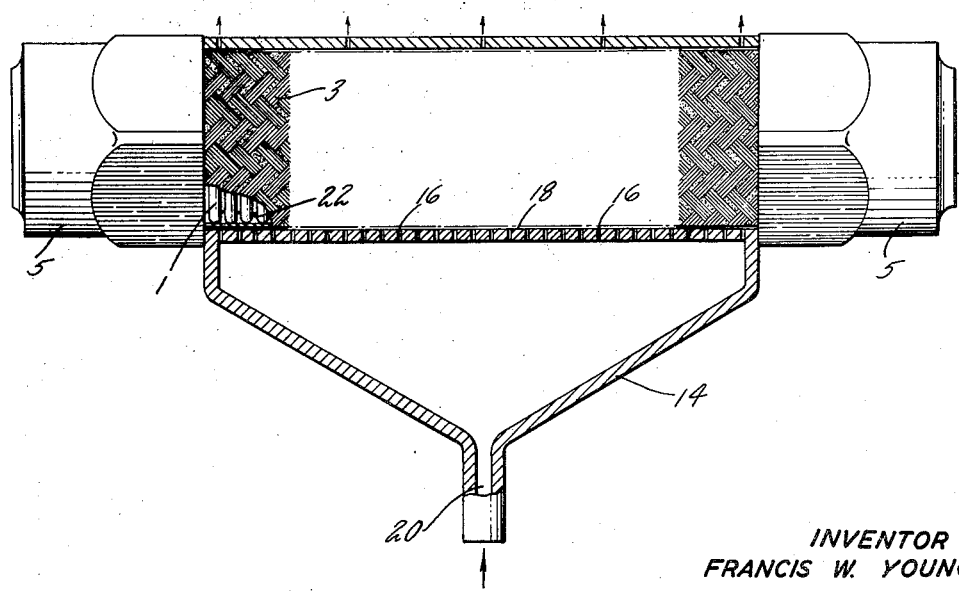
Fig. 4 is a longitudinal sectional view showing another process.

Instead of using a series of holes 10 in mold 9 through which to force the uncured vibration damping compound, other type molds may be used such as the construction shown in Fig. 4. This mold consists of a longitudinal injection manifold 14 which is tapered to cause uncured compound to be distributed at substantially equal pressures to a longitudinal series of holes 16 in mold body 18. The uncured compound can be injected through one opening 20 but need be injected under a relatively high pressure. Holes 16 are so spaced that the uncured compound will be injected into the inwardly extending corrugations 22 of tube 1.

Figure 2:
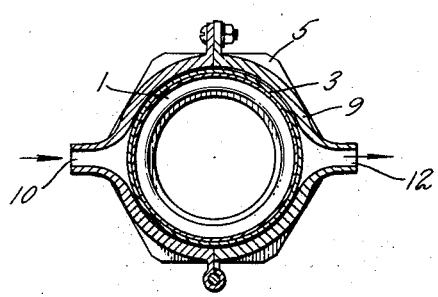
Fig. 2 is a sectional view on line 2—2 of Fig. 1.

If the uncured compound is injected directly into the mold 9 through one or a series of holes 10 as shown in Figs. 1 and 2, it will be necessary that there be a connecting line to each hole 10 but the uncured compound can be injected at low pressure.

Figure 3:
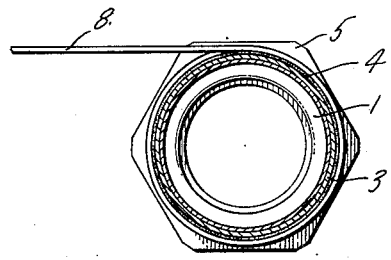
Fig. 3 is a transverse sectional view of a modified process.

Another process whereby the uncured vibration damping compound can be forced through sheath 3 and into the corrugations of tube 1 is by spirally winding tape 8 tightly over the layer of uncured compound as in Fig. 3. This will cause the uncured compound to penetrate the full length of the tube 1 and sheath 3. The tape can then be removed and the uncured compound restrained for curing by other means.

A third process particularly applicable where sheath 3 is highly susceptible to abrasion, is to wrap a sheet of partially cured vibration damping compound around the layer of uncured compound and by means of a pressure source, force the uncured compound through sheath 3 and into the corrugations of tube 1. The sheet of partially cured compound is preselected to be of such a length that it will abut end fittings 5 when assembled and of such width that one edge will abut the other or overlap slightly to form a smooth seam. This sheet of partially cured compound 4 will later serve as a particularly durable anti-abrasive shield for sheath 3.

The uncured silicone is temperature cured to attain the proper resiliency for optimum vibration damping qualities. The uncured vibration damping compound or silicone contains volatile substances which turn to gas at certain temperatures. By quickly raising the uncured silicone compound to a temperature above the gas forming temperatures in the initial stage of curing, the evolution of these gases will be accelerated and the compound will become sufficiently hard quickly, so that the gases can not be liberated by working to the surface but form a porosity in the compound. This porosity of the compound by initially curing at elevated temperatures is called sponging. This sponging action is highly desirable for it gives the compound sufficient resiliency and compressibility to effectively dampen vibrations, is light in weight and does not unduly restrain tube flexibility. Most silicone compounds will sponge if quickly raised to temperatures of from 300° to 480° F.

In the process of sponging then further curing the uncured silicone compound, the hose assembly, with the uncured compound extending into the inwardly extending corrugations of metal tubing 1 and extending outwardly thru sheath 3, is placed in a heated unit. The temperature of the unit is sufficiently high that the uncured compound, starting at its outer surface is quickly raised to a gas generating temperature. These gases are first generated in the outer periphery of the uncured silicone since heat reached this portion of the uncured silicone first. The gases generated in the outer periphery or layer 4 of the uncured compound will be liberated due to the fact that they are in or near a surface area. This outer portion of the compound will continue to cure until all of its gases are liberated and a cured skin is formed surrounding the silicone compound. As heat penetrates to successive layers of the uncured silicone, gases are generated but can not be liberated thru this skin so that each successive concentric layer of uncured compound can liberate less gas than its adjacent outer layer so that the sponging effect and therefore the resiliency of the compound increases inwardly.

The hose assembly can be cured to a degree where optimum anti-abrasion qualities exist in outer layer 4 and optimum resiliency is attained in the portions of the compound within the tube corrugations.

In hose assemblies intended for use in areas where abrasion problems are particularly acute, the hose assembly could be made by the third process described above so that an uncured compound within the corrugations of the tube is enclosed within and surrounded by a partially cured layer of compound enveloping sheath 3. In this type of hose assembly, the partially cured layer will be unaffected by the temperature required for sponging the uncured compound. When the sponging treatment is complete, the hose assembly is then cured to such a degree that the uncured compound attains proper resiliency for vibration damping while the partially cured outer layer attains proper hardness to serve as an anti-abrasive protector for sheath 3.

It is to be understood that the invention is not limited to the specific embodiment herein illustrated and described, but may be used in other ways without departure from its spirit as defined by the following claims.

I claim:

1. In a flexible metal hose, a circumferentially corrugated length of metal tubing, a braided wire sheath surrounding and concentric with said tubing, and a vibration damping material filling at least a portion of the externally opening corrugations and extending outwardly through and surrounding said sheath to serve as a protector against abrasion, said material extending the full length of and adhering to said tubing and said sheath.

2. In a flexible metal hose, a circumferentially corrugated length of metal tubing having inwardly extending corrugations, a braided wire sheath surrounding and concentric with said tubing, attachment fittings located at each end of said tubing and said sheath and having recessed end surfaces to which said tubing and said sheath are attached, a vibration damping material filling at least a portion of the corrugations and extending outwardly through said sheath to protect against abrasion, said material extending the full length of said tubing and sheath and adhering to said tubing, sheath and end surfaces.

3. A flexible metal hose as described in claim 1 in which said material forms a one-piece vibration damper and protective coating.

4. In a flexible metal hose, a thin walled metal conductor convoluted for flexibility, a braided wire sheath surrounding and concentric with said conductor, attachment fittings at each end of said conductor and said sheath and integrally attached thereto, a resilient compound filling at least a portion of the exteriorly opening corrugations for the full length of said hose and extending outwardly through said sheath to protect against abrasion.

5. A flexible metal hose intended for use on aircraft engine afterburners under conditions requiring qualities of good heat and cold resistance, vibration damping and flexibility, said hose consisting of a corrugated flexible tubing, a braided wire sheath enclosing said tubing, connection fittings to which each end of said tubing and said sheath are integrally attached, a one-piece vibration damper comprising substantially concentric adhered layers of material increasing in resiliency inwardly to form a relatively hard anti-abrasive covering surrounding said sheath, said material extending inwardly through the sheath and filling at least a portion of the depth of the exteriorly opening corrugations for the full length of said tubing.

6. In the manufacture of a heat and cold resistant, vibration damped, lightweight, flexible metal hose, the method comprising attaching connecting fittings to each end of a flexible corrugated tubing and an enclosing wire braided sheath in such a fashion that the unit is capable of being successfully inspected and pressure tested, then applying a coating of uncured vibration damping compound around said sheath, compressing said compound inwardly through said sheath and into the corrugations for the full length of said tubing and said sheath and so that it abuts against the end surfaces of said connecting fittings and extends outwardly to enclose said sheath, and then curing said compound until it possesses the desirable resiliency.

7. In the manufacture of a heat and cold resistant, vibration damped, lightweight, flexible metal hose, the method comprising attaching connecting fittings to each end of a flexible corrugated tubing and an enclosing wire braided sheath in such a fashion that the unit is capable of being successfully inspected and pressure tested, applying a coating of uncured vibration damping compound around said sheath, compressing said compound inwardly through said sheath and into the corrugations for the full length of said tubing and said sheath and so that it abuts against the end surfaces of said connecting fittings and extends outwardly until it is at least flush with the outer surface of said sheath, then wrapping a sheet of partially cured vibration damping compound for the full hose length between said connecting fittings, then curing said vibration compound until the uncured portion reaches the desirable resiliency and until the partially cured sheet reaches proper hardness to serve as an anti-abrasion protector.

8. In the manufacture of a heat and cold resistant vibration damped, lightweight, flexible metal hose, the method comprising attaching connecting fittings to each end of a flexible corrugated tubing and an enclosing wire braided sheath in such a fashion that the unit is capable of being successfully inspected and pressure tested, placing a cylindrical mold of greater diameter than said sheath around said sheath, introducing uncured silicone under pressure into said mold until it is filled, then curing said silicone to the point of proper vibration damping resiliency.

9. In the manufacture of a heat resistant vibration damped, lightweight, flexible metal hose, the method comprising attaching connecting fittings to each end of a flexible corrugated tubing and an enclosing wire braided sheath in such a fashion that the unit is capable of being successfully inspected and pressure tested, introducing an uncured vibration damping compound through said sheath until it fills at least a portion of the exteriorly opening corrugations, then curing said compound to proper resiliency for vibration damping.

10. In the manufacture of a vibration damped flexible metal hose, the method comprising placing a thin walled metal conductor convoluted for flexibility within a braided wire covering and physically attaching both ends of said conductor and said covering to connecting fittings in such a fashion that the unit is capable of being inspected and pressure tested, surrounding said covering with a layer of uncured rubber compound and forcing said compound through said covering and into the cavities of the convoluted conductor for a portion of the height of said cavities, then enclosing the uncured rubber compound with a layer of partially cured rubber compound, then curing the said compound at such a temperature that the uncured compound will sponge, then at such a temperature that the uncured compound will attain proper resiliency for optimum vibration damping and the partially cured compound will become sufficiently hard to serve as an anti-abrasion cover.

11. In the manufacture of a heat resistant vibration damped, lightweight, flexible metal hose, the method comprising attaching connecting fittings to each end of a flexible corrugated tubing and an enclosing wire braided sheath in such a fashion that the unit is capable of being successfully inspected and pressure tested, placing a cylindrical mold of greater diameter than said sheath around said sheath, introducing uncured silicone under pressure into said mold until it is filled, then curing said vibration damping compound at such a temperature that said uncured compound will sponge, then enclosing said uncured compound with a layer of partially cured vibration damping compound, then curing the hose at such a temperature that the uncured compound will attain proper resiliency for optimum vibration damping and the partially cured compound will become sufficiently hard to serve as an anti-abrasion cover.

References Cited in the file of this patent

UNITED STATES PATENTS

| 92,381 | Smith | July 6, 1869 |
| 1,746,821 | Davis | Feb. 11, 1930 |
| 2,044,900 | Debenedetti | June 23, 1936 |
| 2,241,355 | Machlachlan | May 6, 1941 |
| 2,320,367 | Leathers | June 1, 1943 |
| 2,383,733 | Parker | Aug. 28, 1945 |
| 2,449,369 | Doane et al. | Sept. 14, 1948 |
| 2,525,070 | Greenwald et al. | Oct. 10, 1950 |
| 2,565,184 | Parlasca | Aug. 21, 1951 |
| 2,606,574 | Lefebvre | Aug. 12, 1952 |
| 2,622,657 | Klane | Dec. 23, 1952 |

FOREIGN PATENTS

| 586,183 | Great Britain | Mar. 10, 1947 |

OTHER REFERENCES

Article by Arch L. Foster, published in Oil and Gas Journal, Oct. 6, 1945, pages 86, 87, 88, 112, 113. (Copy Div. 52 Pat. Off.)